(12) United States Patent
Onodera

(10) Patent No.: US 6,710,707 B2
(45) Date of Patent: Mar. 23, 2004

(54) VEHICLE-MOUNTED INPUT DEVICE

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 128 days.

(21) Appl. No.: 09/814,294

(22) Filed: Mar. 21, 2001

(65) Prior Publication Data

US 2001/0026229 A1 Oct. 4, 2001

(30) Foreign Application Priority Data

Mar. 30, 2000 (JP) ........................................ 2000-094704

(51) Int. Cl.[7] .................................................. H04B 3/36
(52) U.S. Cl. ..................... 340/407.1; 340/7.6; 340/438; 341/27; 345/184; 345/702
(58) Field of Search .................... 340/407.1, 407.2, 340/438, 7.6, 825.46, 825.19; 341/27, 31, 29; 434/112, 113, 114, 115, 116; 345/156, 168, 173, 184, 701, 702

(56) References Cited

U.S. PATENT DOCUMENTS

| | | | | |
|---|---|---|---|---|
| 5,638,060 A | * | 6/1997 | Kataoka et al. ............... | 341/20 |
| 5,747,759 A | * | 5/1998 | Lochmahr et al. .......... | 200/5 R |
| 5,923,267 A | * | 7/1999 | Beuk et al. ............ | 340/825.56 |
| 6,223,103 B1 | * | 4/2001 | Patil ............................. | 701/1 |
| 6,256,558 B1 | * | 7/2001 | Sugiura et al. ................ | 701/1 |

FOREIGN PATENT DOCUMENTS

| | | |
|---|---|---|
| DE | 196 10 700 A1 | 9/1997 |
| EP | 0 816 155 A2 | 1/1998 |
| EP | 0 960 784 A1 | 5/1998 |
| JP | 09 306314 A | 11/1997 |
| JP | Hei 11-278173 | 10/1999 |
| JP | 11-278173 * | 12/1999 |
| SE | 505 151 C | 7/1997 |

* cited by examiner

Primary Examiner—Daniel J. Wu
Assistant Examiner—Son Tang
(74) Attorney, Agent, or Firm—Brinks Hofer Gilson & Lione

(57) ABSTRACT

A vehicle-mounted input device for controlling by a single manual control section the function of air conditioner, radio, television, CD player, car navigation system, etc. mounted on a motor vehicle. The manual control section has finger detector, for example a photo interrupter, and alerter, for example vibrator, which vibrates in a mode corresponding to the control position of the manual control section. When the manual control section is held by hand, the finger detector detects the driver's finger, and the alerter vibrates in a mode corresponding to a selected control position of the manual control section, thereby enabling the driver to see the control position of the manual control section before and after a changeover by a blind touch, that is, without observing a display device. Thus it helps facilitate driving the motor vehicle and changing the function of the vehicle-mounted electronic apparatus.

7 Claims, 7 Drawing Sheets

FIG. 12 PRIOR ART

WHEN AIR CONDITIONER IS SELECTED BY A SWITCH

| GUIDE SLOT POSITIONS TO BE SELECTED | FUNCTIONS TO BE SELECTED |
|---|---|
| A | NEUTRAL |
| B | LOCATION OF FRESH AIR OUTLET |
| C | DIRECTION OF FRESH AIR OUTLET |
| D | AIR VOLUME ADJUSTMENT |
| E | AUTO AIR CONDITIONER |
| F | FRONT DEFROSTER |
| G | TEMPERATURE ADJUSTMENT |
| H | REAR DEFROSTER |
| I | DIRECTION OF FRESH AIR OUTLET |

FIG. 13 PRIOR ART

WHEN RADIO IS SELECTED BY A SWITCH

| GUIDE SLOT POSITIONS TO BE SELECTED | FUNCTIONS TO BE SELECTED |
|---|---|
| A | NEUTRAL |
| B | STATION SELECTION (AM/FM) |
| C | VOLUME CONTROL |
| D | TUNING |
| E | STATION 1 |
| F | STATION 2 |
| G | STATION 3 |
| H | STATION 4 |
| I | STATION 5 |

VEHICLE-MOUNTED INPUT DEVICE

BACKGROUND OF THE INVENTION

1. Field of the Invention

This invention relates to a vehicle-mounted input device for operating various vehicle-mounted electronic apparatuses concentrically by means of a single manual control section and, more particularly, to means for improving controllability of the input device.

2. Description of Related Art

Automobiles in recent years are equipped with many electronic apparatuses such as air conditioner, radio, television, CD player and car navigation system. If the driver tries to control these electronic apparatuses separately, it is quite likely that the driving of the automobile will be adversely affected. To prevent this, therefore, there has been proposed a vehicle-mounted input device capable of performing the control of all these apparatuses by manipulating a single manual control section, for the purpose of facilitating on-off operation of a desired electronic apparatus, selection of its function, and adjustment of the selected function while performing safety driving.

FIGS. 8 through 13 show the configuration of a conventional vehicle-mounted input device that has been proposed. FIG. 8 is an inside view of an automobile mounted with the vehicle-mounted input device. FIG. 9 is a side view of the vehicle-mounted input device of a conventional example. FIG. 10 is a plan view of the manual control section of the vehicle-mounted input device. FIG. 11 is a plan view of a guide plate of the vehicle-mounted input device. FIG. 12 is a table showing a relation between the position of engagement of an engagement pin with a guide slot when the air conditioner has been selected by the switching device and the function to be selected. FIG. 13 is a table showing a relation between the position of engagement of an engagement pin with a guide slot when a radio has been selected by a switching device, and a function to be selected.

As shown in FIG. 8, the vehicle-mounted input device 100 of this example is located in a console box 200 mounted between the driver's seat and the assistant driver's seat of the automobile.

The vehicle-mounted input device 100 of this example, as shown in FIGS. 9 through 11, is mainly comprised of a manual control section 110 having a couple of click switches 111 and 112 as signal input means and three rotary variable resistors 113, 114 and 115; an XY table 120 which is driven in the X direction and the Y direction intersecting at right angles with the X direction by the manual control section 110; a stick controller 130 as positional signal input means for inputting signals according to the direction and amount of operation of the XY table 120; and a guide plate 140 engaged with the manual control section 110 through the XY table 120.

The manual control section 110 and the XY table 120 are integrally connected by a connecting shaft 150. The XY table 120 is engaged with the guide plate 140 by sliding the forward end of an engaging pin 160 projecting from the underside of the XY table 120, into a guide slot 141 formed in the upper surface of the guide plate 140. The guide slot 141, as shown in FIG. 11, includes three longitudinal slots 141a, 141b, and 141c arranged at a fixed spacing, and one horizontal slot 141d connecting at the central part these three longitudinal slots 141a, 141b and 141c. The slots 141a to 141d are formed in a width so that the engaging pin 160 is movable only in the lengthwise direction. Therefore the manual control section 110 and the XY table 120 are movable only in the X direction (in the lengthwise direction of the horizontal slot 141d) within the range of the pattern and size of the guide slot 141, and in the Y direction (in the lengthwise direction of the longitudinal slots 141a to 141c) intersecting at right angles with the X direction.

The changeover of the function of the vehicle-mounted electronic apparatus, as indicated by reference marks A to I, can be done by operating either one of the two click switches 111 and 112 provided on the manual control section 110 after moving the engaging pin 160 to the end or the central portion of the longitudinal slots 141a, 141b, and 141c. That is, information about the position of engagement between the engaging pin 160 and the guide slot 141 selected by operating the manual control section 110 and the XY table 120 can be outputted from the stick controller 130. Therefore, by utilizing the position information, the function of a vehicle-mounted electronic apparatus to be operated can be selected properly.

The function of the electronic apparatus thus selected by operating the manual control section 110 and the click switch 111 or 112 can be adjusted by operating one of the three rotary variable resistors 113, 114 and 115 of the manual control section 110.

The vehicle-mounted input device 100 of the aforementioned configuration is combined with the switching device for alternatively selecting required one of a plurality of vehicle-mounted electronic apparatuses, a display device which displays details of the name of the electronic apparatus selected by the switching device, and details of operation by the vehicle-mounted input device 100, and the computer for controlling these devices, thereby concentrically controlling the electronic apparatus.

A switching device 170 is a combination of a plurality (five in the example shown in FIG. 8) of switches 171a to 171e. As shown in FIG. 8, the switching device 170 is mounted in the vicinity of the setting section of the vehicle-mounted input device 100 in the console box 200. Furthermore, a display device 180, such as a liquid-crystal display device, is mounted in an easy-to-view position on the console box 200. The computer is located inside of the console box 200 and therefore is not illustrated.

The switches 171a to 171e provided in the switching device 170 are connected to a plurality of vehicle-mounted electronic apparatuses. For example, in the case the switches 171a, 171b, 171c, 171d and 171e are connected respectively to the air conditioner, radio, television, CD player, and car navigation system which are mounted on an automobile, the air conditioner can be selected alternatively by operating the switch 171a, and also the radio can be selected alternatively by operating the switch 171b. Other electronic apparatuses also can be selected by a similar switch operation. Therefore, it is possible to turn on and off a desired electronic apparatus by operating the switches 171a to 171e of the switching device 170.

The selection and adjustment of the function of the electronic apparatus thus selected by the switching device 170 can be operated by the vehicle-mounted input device. The function that can be selected by the vehicle-mounted input device 100 varies with the type of the electronic apparatus selected. For example, when the air conditioner has been selected by the switching device 170, the relation between the function to be selected and the positions of engagement A to I of the engaging pin 160 which engages with the guide slot 141 shown in FIG. 11 is as shown in FIG.

12. When the radio has been selected by the switching device 170, the relation between the function selected and the positions of engagement A to I is as shown in FIG. 13.

In the meantime, the function that can be adjusted by the vehicle-mounted input device 100 differs with the type and function of the electronic apparatus selected. For example, when the air conditioner is selected by the switching device 170 and "AIR FLOW RATE CONTROL" is selected by the manual control section 110, the air flow rate in the air conditioner can be controlled by the first rotary variable resistor 113. Also when the air conditioner is selected by the switching device 170 and the "TEMPERATURE CONTROL" is selected by the manual control section 110, the set temperature of the air conditioner can be controlled by operating the second rotary type variable resistor 114. Furthermore, when the radio is selected by the switching device 170 and the "VOLUME CONTROL" is selected by the manual control section 110, the radio volume can be controlled by operating the first rotary variable resistor 113. Also when the radio is selected by the switching device 170 and "TUNING" is selected by the manual control section 110, radio tuning can be performed by operating the second rotary variable resistor 114.

The vehicle-mounted input device 100 of the conventional example is not provided with means by which the vehicle driver can see by a blind touch the current control position of the manual control section 110. Therefore, it is necessary for the driver to see the display device 180 to confirm the current control position of the manual control section 110. The conventional input device therefore has room for improvement in controllability.

SUMMARY OF THE INVENTION

In view of the above-described problem of the conventional input device, it is an object of this invention to provide a vehicle-mounted input device having excellent controllability.

The vehicle-mounted input device comprises a manual control section, position signal input means for inputting a signal into a control unit corresponding to the direction of control and/or the amount of operation of the manual control section, finger detecting means located in the manual control section, and alerting means for alerting the driver by a blind touch by outputting a signal corresponding to the control position of the manual control section when the finger is detected by the detecting means.

The finger detecting means detects the driver's hand holding the manual control section. The alerting means gives off a signal alerting the driver, by a blind touch, of the control position of the manual control section while the driver's finger is touching the manual control section. According to the aforesaid configuration, therefore, the driver can see the control position of the manual control section without observing the display device. Also when the control position of the manual control section is moved to another control position, the driver can see the control position of the manual control section after operation. The control position of the manual control section, therefore, can be changed over by a blind touch and also whether a required control position of the manual control section has been changed over is seen by a blind touch, thereby facilitating driving the motor vehicle and changing over the function of the vehicle-mounted electronic apparatus.

The motor vehicle may be provided with a selector switch for selecting a specific electronic apparatus from a plurality of vehicle-mounted electronic apparatuses. The function of the electronic apparatus selected by operating the selector switch can be adjusted by the manual control section. In this case, the alerting means may be configured to alert the driver of either one of, or both of, the type of the electronic apparatus selected by the selector switch and the function of the electronic apparatus to be controlled by the manual control section. In the case of the former, the driver can see by a blind touch both the type of the electronic apparatus selected by the selector switch and the function of the electronic apparatus to be controlled by the manual control section. It is therefore possible to easily and reliably perform the selection of a desired electronic apparatus and the control of the function of the electronic apparatus thus selected. In the case of the latter also, the driver can see by a blind touch either one of the type of the electronic apparatus selected by the selector switch and the function of the electronic apparatus to be controlled by the manual control section. By using a result of the above-described control as a base for decision, it is possible to select a desired electronic apparatus and to control the function of the electronic apparatus thus selected. The function of the desired electronic apparatus can be easily and reliably controlled as compared with the case no material for decision is available.

As the alerting means described above, usable is any arbitrary means capable of producing light, sound, or vibration to alert the driver by a blind touch of the control position of the manual control section. The alerting means is hardly affected by an external environment and can readily and reliably alert the driver of required information; it is therefore particularly desirable to have vibrating means which gives different modes of vibrations to the manual control section in accordance with the control position of the manual control section.

BRIEF DESCRIPTION OF THE DRAWINGS

FIG. 12 is a table showing a relation between the position of engagement of an engaging pin with a guide slot and a function of an air conditioner selected by a switching device; and FIG. 13 is a table showing a relation between the position of engagement of an engaging pin with a guide slot and a function of a radio selected by the switching device.

DESCRIPTION OF THE PREFERRED EMBODIMENTS

Figure 1:
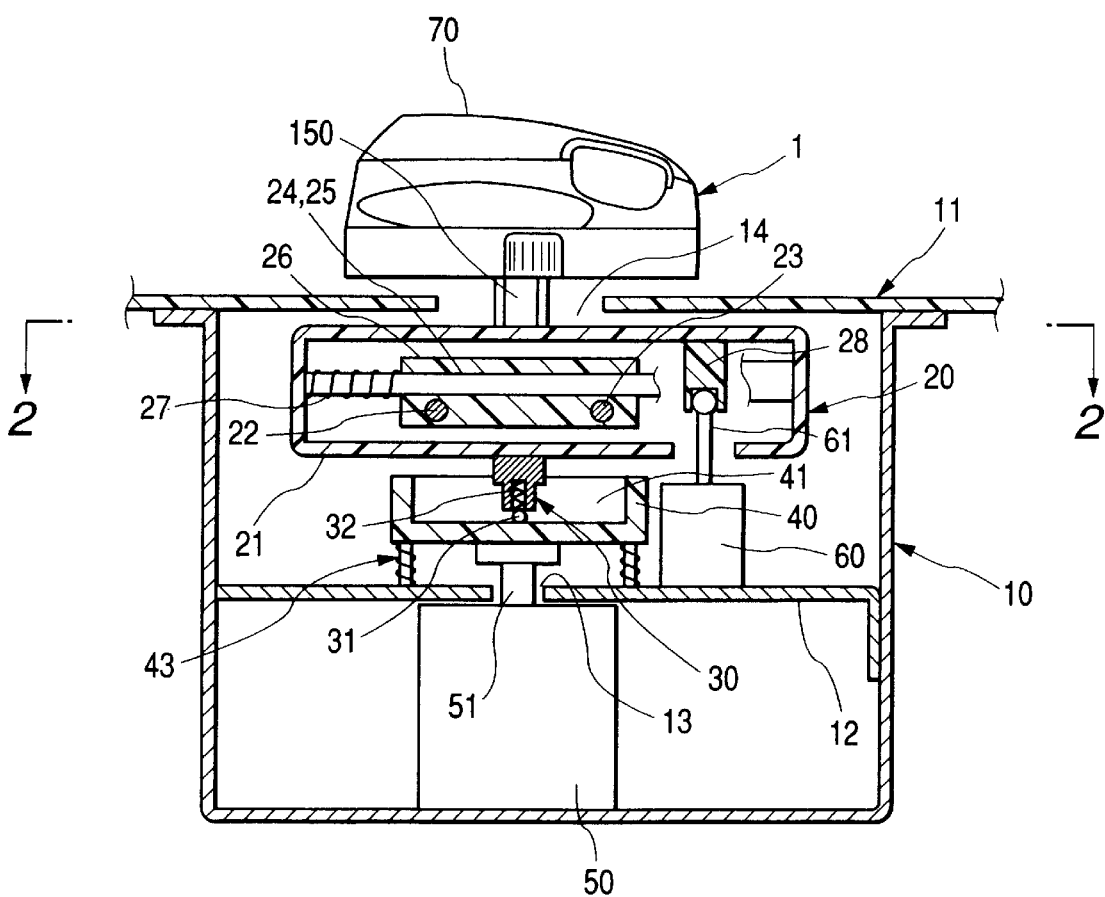
FIG. 1 is a sectional view showing a major portion of a vehicle-mounted input device according to the embodiments.
Figure 2:
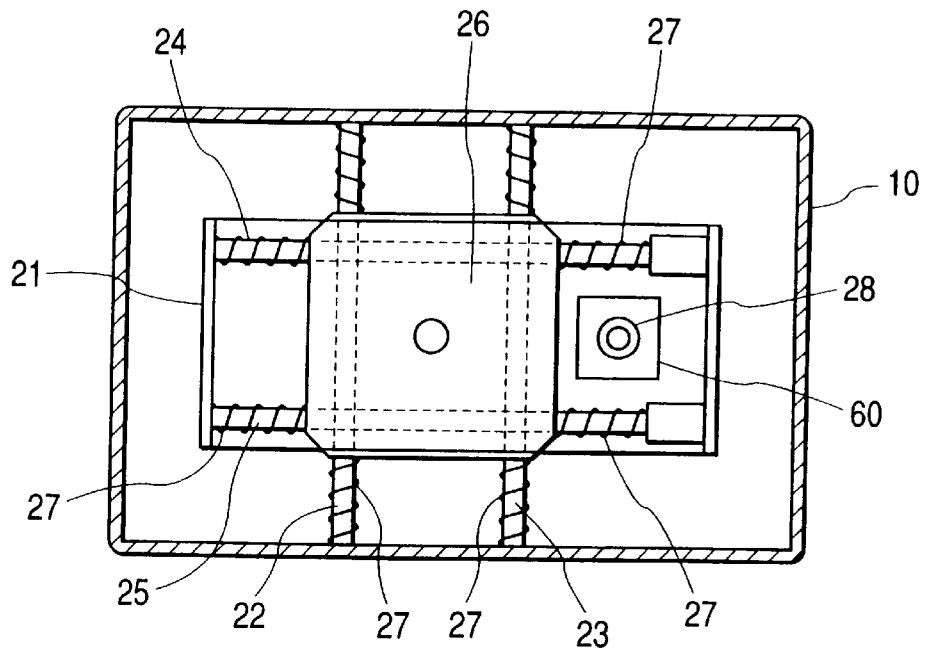
FIG. 2 is a sectional view taken along line 2—2 of FIG. 1.
Figure 3:
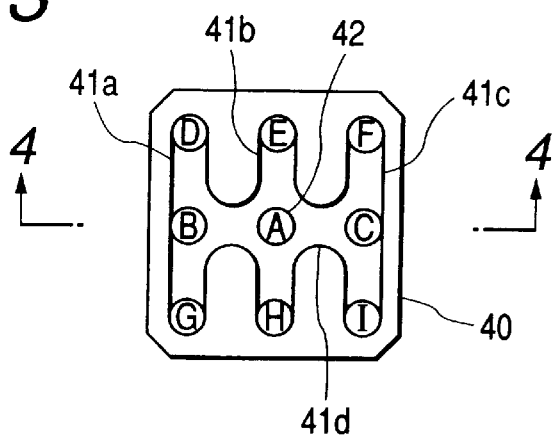
FIG. 3 is a plan view of a guide plate according to the embodiments.
Figure 4:
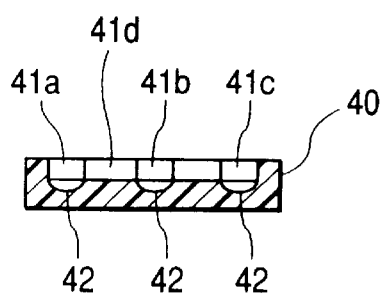
FIG. 4 is a sectional view taken along line 4—4 of FIG. 3.
Figure 5:
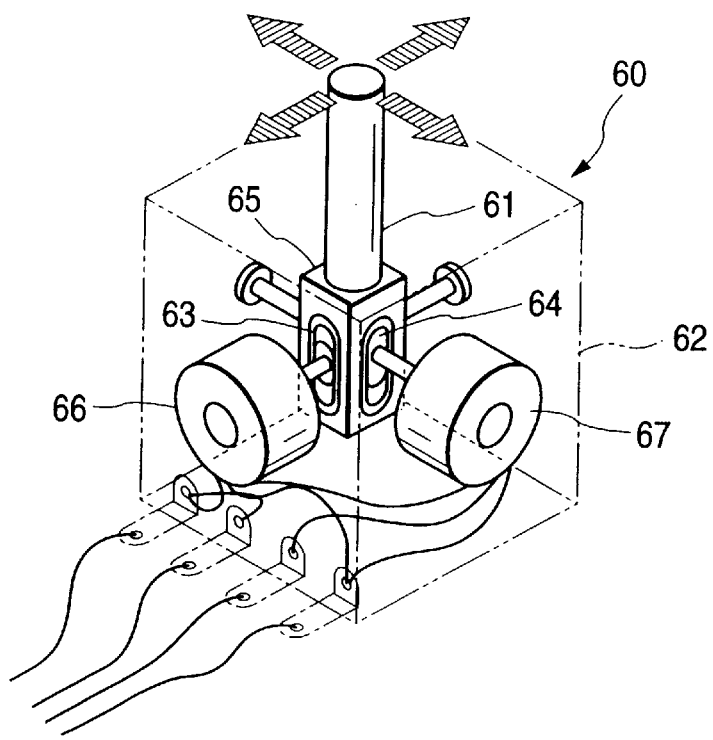
FIG. 5 is a block diagram of a stick controller.
Figure 6:
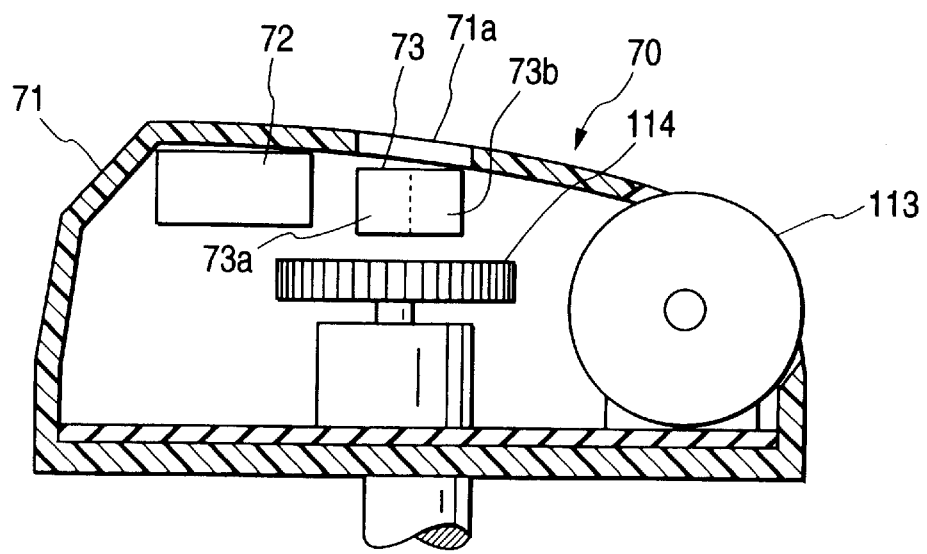
FIG. 6 is a sectional view of a major portion of a manual control section.
Figure 7:
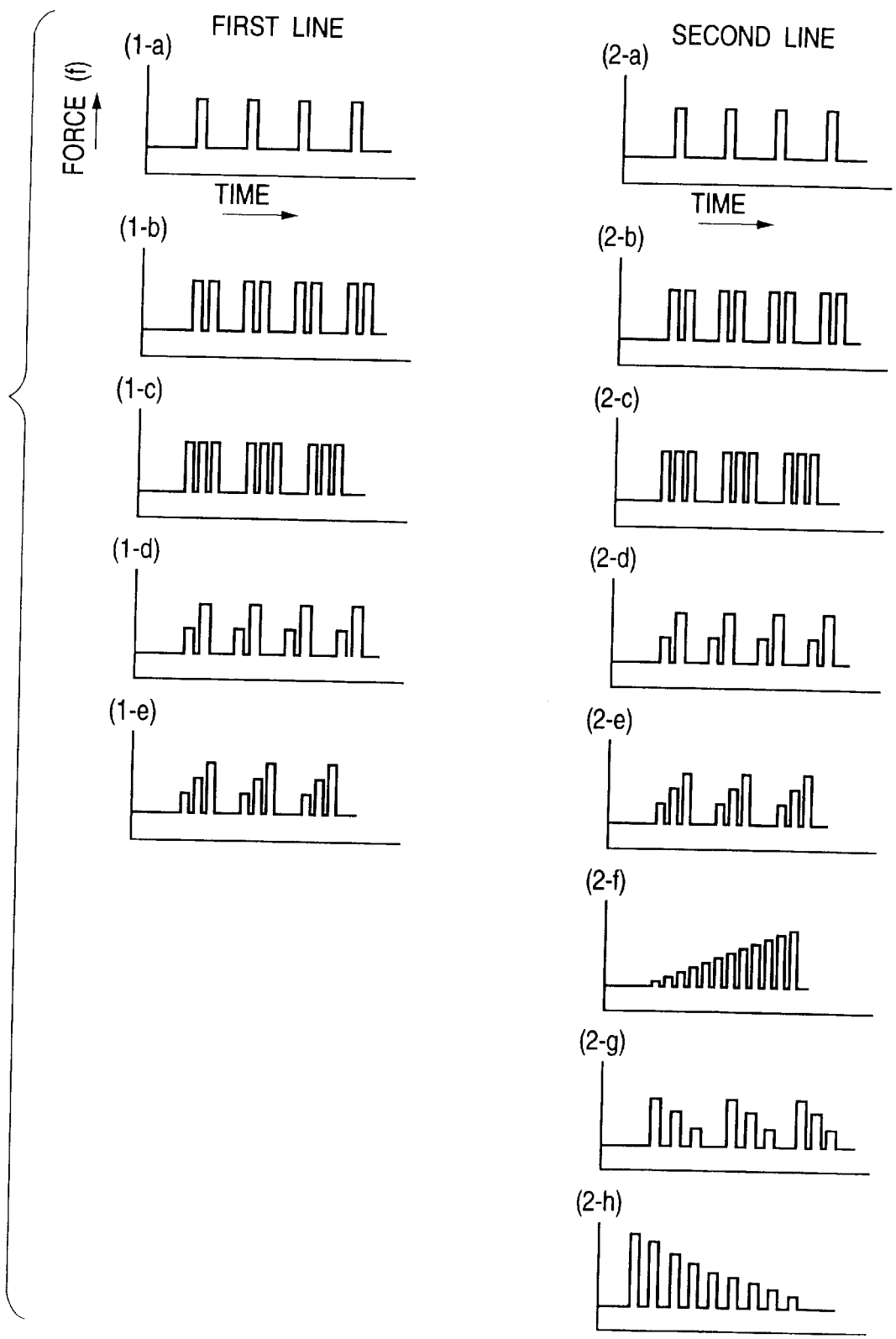
FIG. 7 is a waveform diagram showing modes of vibration to be applied to the manual control section.
Figure 8:
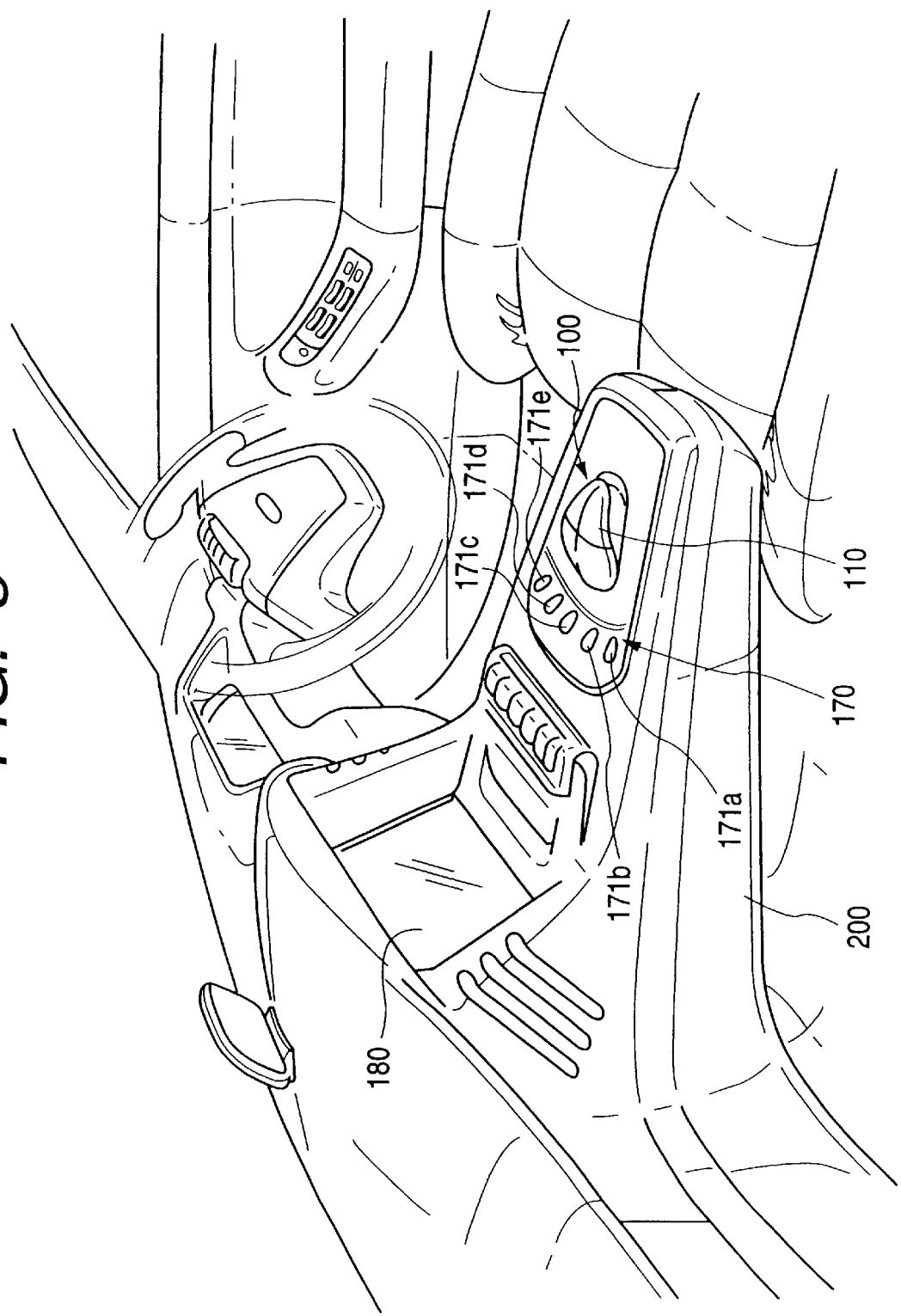
FIG. 8 is an inside view of the automobile equipped with the vehicle-mounted input device.
Figure 9:
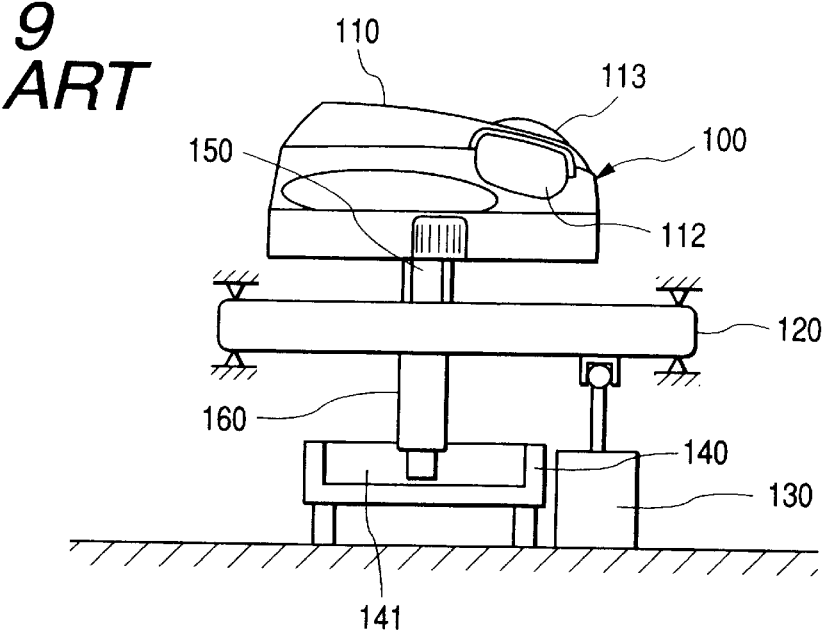
FIG. 9 is a side view of a conventional vehicle-mounted input device.
Figure 10:
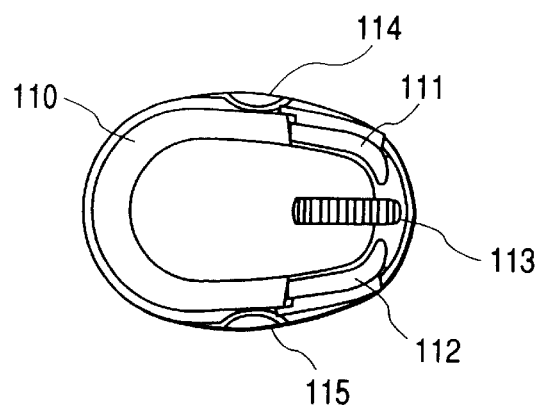
FIG. 10 is a plan view of a manual control section of the conventional vehicle-mounted input device.
Figure 11:
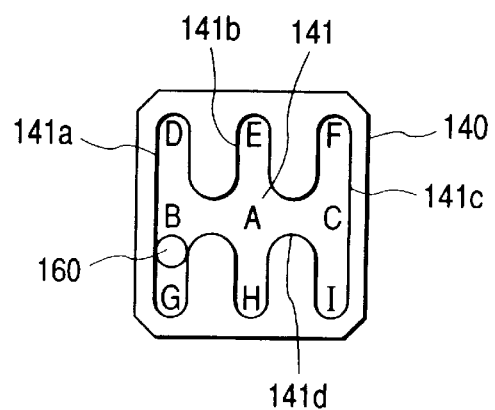
FIG. 11 is a plan view of a guide plate of the conventional vehicle-mounted input device.

One example of a vehicle-mounted input device according to the embodiments of this invention will be explained with reference to FIG. 1 through FIG. 13. FIG. 1 is a sectional view of a major portion of the vehicle-mounted input device according to the embodiment. FIG. 2 is a sectional view taken along line 2—2 of FIG. 1. FIG. 3 is a plan view of a guide plate according to the embodiment. FIG. 4 is a sectional view taken along line 4—4 of FIG. 3. FIG. 5 is a block diagram of a stick controller. FIG. 6 is a sectional view of a major portion of a manual control section. FIG. 7 is a waveform diagram showing examples of modes of vibration to be applied to the manual control section. FIG. 8 to FIG. 13 have been referred to explained the conventional art, which will not be explained herein.

In FIG. 1, numeral 1 denotes a vehicle-mounted input device according to the embodiments. Numeral 10 refers to a cabinet for housing a mechanical part of the vehicle-mounted input device 1. Numeral 11 refers to a panel provided on the opening side of the cabinet 10. Numeral 20 is an XY table. Numeral 30 is an engaging pin. Numeral 40 is a guide plate as guide means. Numeral 50 is a solenoid as guide plate driving means. Numeral 60 is a stick controller as position signal input means. And FIG. 70 denotes a manual control section. The same members or elements as those illustrated in these drawings are designated by the same reference numerals. The vehicle-mounted input device 1 in this example, like the conventional vehicle-mounted input device 100, is combined with the switching device 170 which alternatively selects a desired electronic apparatus from among a plurality of vehicle-mounted electronic apparatuses, the display device 180 which displays the name of the electronic apparatus selected by the switching device 170 and details of operation to be effected by the vehicle-mounted input device 1, and a computer for controlling these devices. The vehicle-mounted input device 1 is housed in the console box 200 mounted between the driver's seat and the assistant driver's seat of the automobile (see FIG. 8).

The cabinet 10 is a square, tube-shaped cabinet capable of housing an XY table 20, an engaging pin 30, a guide plate 40, a solenoid 50, and a stick controller 60 as is clear from FIG. 1 and FIG. 2. In the cabinet 10 is installed a partition plate 12 for holding the guide plate 40 and the stick controller 60. The partition plate 12 is provided with a through hole 13 in which a driving shaft 51 of the solenoid 50 is installed. On the opening side of the cabinet 10 is installed a panel 11, which is also provided with a through hole 14 for installation of the connecting shaft 150 which connects the manual control section 70 with the XY table 20.

The XY table 20, as is clear from FIG. 1 and FIG. 2, comprises a loop-like slider 21 connected with the manual control section 70 through the connecting shaft 150, two X-direction guide rods 22 and 23, two Y-direction guide rods 24 and 25, a slider block 26 which is located inside of the slider 21 and movably holds the slider 21 moving in the X and Y directions through the guide rods 22 to 25, a spring 27 as a center reset mechanism to press the slider 21 toward constant alignment with the center of the slider block 26, and a connecting portion 28 for controlling the control lever 61 of the stick controller 60.

In the first side section of the slider block 26, two parallel through holes are formed at a predetermined spacing through which the X-direction guide rods 22 and 23 can slide. In the second side section orthogonal to the first side section, two parallel through holes are also formed at a predetermined spacing through which the Y-direction guide rods 24 and 25 can slide. The X-direction guide rods 22 and 23 are slidably inserted through the through holes formed in the first side section of the slider block 26, with their both ends of these guide rods 22 and 23 held on two mutually opposing surfaces of the cabinet 10 as shown in FIG. 2. On the other hand, the two Y-direction guide rods 24 and 25 are also slidably inserted through the through holes formed in the second side section of the slider block 26. Both ends of these guide rods 24 and 25 are held on two mutually opposing surfaces of the slider 21 as shown in FIGS. 1 and 2. Therefore, the slider 21 is movable in both the X direction (the direction along the X-direction guides rods 22 and 23) and the Y direction (the direction along the Y-direction guide rods 24 and 25) in relation to the slider block 26.

The engaging pin 30 is installed downward at the central part of the underside of the slider 21. In the forward end of the engaging pin 30 is inserted a small-diameter ball 31, which is vertically movable and is constantly pressed downward by means of a spring 32 inserted in the engaging pin 30. The small-diameter ball 31 is so set as to partly protrude downward out below the forward end of the engaging pin 30, being in elastic contact with the bottom surface of a guide slot 41 formed in the guide plate 40.

In the upper surface of the guide plate 40 is formed a guide slot 41 which includes, as shown in FIG. 3, three longitudinal slots 41a, 41b and 41c and one horizontal slot 41d connected to the central part of these three longitudinal slots 41a, 41b and 41c. At both ends and central part of each of the slots 41a through 41d are formed shallow round recesses 42. The guide plate 40, as shown in FIG. 1, is vertically movably attached on the upper surface of the partition plate 12 and connected with the driving shaft 51 of the solenoid 50. Between the guide plate 40 and the upper surface of the partition plate 12 is interposed a spring 43 for constantly pressing the guide plate 40 upward. Therefore, the guide plate 40 is constantly moved upward by the resilience of the spring 43 when the solenoid 50 is being de-energized, and moved downward by the attraction of the solenoid 50 when the solenoid 50 is being energized.

During de-energization of the solenoid 50, the guide plate 40 is set at such a level that the engaging pin 30 can be engaged in the guide slot 41 with the small-diameter ball 31 in the forward end of the engaging pin 30 held in elastic contact with the bottom surface of the guide slot 41 by the resilience of the spring 32. Reversely during energization of the solenoid 50, the guide plate 40 is set at such a level that the engaging pin 30 can be disengaged from the guide slot 41.

The stock controller 60 is attached on the partition plate 12. The control lever 61 thereof is rockably connected to the connecting portion 28 in the slider 21 of the XY table 20. The stick controller 60 to be used may be of any known type, but is required to be of a simple structure with high position detecting accuracy. It is specially preferable to use a stick controller comprising, as shown in FIG. 5, the control lever 61 rockably mounted on the cabinet 62, a transducer 65 for converting the angle and direction of inclination of the control lever 61 into the quantity of rotation of the two rotors 63 and 64 which are arranged at right angles to each other, and two rotary variable resistors or encoders 66 and 67 for converting the amount of rotation of the two rotors 63 and 64 into an electric signal.

The manual control section 70 to be used is provided with two click switches 111 and 112 and three rotary variable resistors 113, 114 and 115 similarly to the conventional manual control section 110. In the casing 71 of the manual control section 70 are mounted a vibrating device (vibrating means) 72 and a photo interrupter (finger detecting means) 73 as shown in FIG. 6. A transparent window 71a is formed in a part of the casing 71 located on the opposite side of the light emitting and light receiving sections of the photo interrupter 73.

The photo interrupter 73 is comprised of a light-emitting device 73a and a light-receiving device 73b. The light emitted from the light-emitting section of the light-emitting device 73a is allowed out through the transparent window 71a. When a finger touches the manual control section 70, the light reflected from the finger is received by the light-receiving section of the light-receiving device 73b; that is, the photo interrupter 73 detects the finger put on the manual control section 70, outputting a signal to start the vibrating device 72.

The vibrating device 72 is started by a starting signal from the photo interrupter 73. The vibrating device 72 thus started produces vibrations inherent to an electronic apparatus selected by operating five switches 171a to 171e (see FIG. 8) provided on the console box 200 and vibrations inherent to the control position of the manual control section 70, that is, the control position of the manual control section 70 which is changed over by engaging the small-diameter ball 31 provided in the engaging pin 30 in any one of nine recesses 42 formed in the guide slot 41, thus alerting the driver of the type of an electronic apparatus currently selected and the current control position of the manual control section 70. The driver, therefore, can see the type of the electronic apparatus thus currently selected and the details of function control being currently performed by the manual control section 70. It is, therefore, possible for the driver to select another electronic apparatus and to control by a blind touch the function of the electronic apparatus thus selected by the manual control section 70. That is, the driver can easily control the function of the vehicle-mounted electronic apparatus while driving safely. When the control position of the manual control section is changed over to another control position, the vibrating device 72 produces vibrations inherent to a newly selected control position of the manual control section 70. The driver, therefore, can feel by a blind touch whether or not the manual control section 70 has been changed over to a desired control position.

FIG. 7 gives examples of vibration modes inherent to the electronic apparatus selected by means of the switches 171a to 171e, and vibration modes inherent to control positions when the manual control section 70 is changed over from the neutral position A to control positions B to I. In FIG. 7, the first line indicates vibration modes inherent to each electronic apparatus selected by changing over the switches 171a to 171e. The example (1-a) indicates a vibration mode generated when the air conditioner is selected by operating the switch 171a. The example (1-b) indicates a vibration mode generated when the radio is selected by operating the switch 171b. The example (1-c) indicates a vibration mode generated when the television is selected by operating the switch 171c. The example (1-d) indicates a vibration mode generated when the DC player is selected by operating the switch 171d. And the example (1-e) indicates a vibration mode generated when the car navigation system is selected by operating the switch 171e. The second line in FIG. 7 shows vibration modes inherent to each control position when the manual control section 70 is changed over from the neutral position A to the control positions B through I. The example (2-a) gives a vibration mode generated when the control position of the manual control section 70 is changed over to B. The example (2-b) shows a vibration mode generated when the control position of the manual control section 70 is changed over to C. The example (2-c) is a vibration mode generated when the control position of the manual control section 70 is changed over to D. The example (2-d) shows a vibration mode generated when the control position of the manual control section 70 is changed over to E. The example (2-e) shows a vibration mode generated when the control position of the manual control section 70 is changed over to F. The example (2-f) shows a vibration mode generated when the control position of the manual control section 70 is changed over to G. The example (2-g) shows a vibration mode generated when the control position of the manual control section 70 is changed over to H. And the example (2-h) presents a vibration mode generated when the control position of the manual control section 70 is changed over to I.

When a finger touches the manual control section 70, the driver is continuously alerted at a specific interval of the vibration mode inherent to the electronic apparatus currently selected and the vibration mode inherent to the current control position of the manual control section 70. For example, referring to FIGS. 12 and 13, when the vibration mode shown in the example (1-a) and the vibration mode shown in the example (2-a) are continuously alerted at a given interval, the driver can see by a blind touch that the position of the fresh air outlet of the air conditioner has been selected. Similarly, when the vibration shown in (1-b) and the vibration shown in (2-a) are continuously alerted at a given interval, the driver can see by a blind touch that the current radio station (AM/FM) has been selected. The driver therefore can see by a blind touch the type of an electronic apparatus currently selected and the current changeover position of the manual control section 70 by feeling vibrations from the manual control section 70.

The changeover of the vibration mode is done by a computer built in the console box 200 (see FIG. 8) in accordance with a position signal outputted from the stick controller 60. When the driver releases his finger from the manual control section 70, the start signal from the vibrating device 72 is cut off, thereby stopping the vibrating device 72.

A particularly suitable driving force source of the vibrating device 72 is a solenoid or a piezoelectric element which is of simple configuration. Also usable is a vibrator with a weight eccentrically mounted on a motor shaft or such a device mounted with a weight on the forward end of an elastic body made of a ferromagnetic material, which is excited by an electromagnet. In the example shown in FIG. 6, the vibrating device 72 is directly attached on the casing of the manual control section 70. To enable transmission of great vibration to the driver by the use of a small vibrating device, a vibrating plate may be installed inside of the casing or the vibrating device 72 may be installed to the vibrating plate.

Next, operation of the vehicle-mounted input device 1 of the above-described configuration according to the present embodiment will be explained.

The vehicle-mounted input device of the present embodiment can perform a changeover from engagement to disengagement and vice versa of the engaging pin 30 with the guide slot 41 by turning on and off the solenoid 50. That is, when the solenoid 50 is in a de-energized state, the guide plate 40 rises with the resilience of the spring 43 to engage the engaging pin 30 with the guide slot 41. In this case, it is possible to select the function of each vehicle-mounted electronic apparatus and to control the selected function by the same method as in the conventional vehicle-mounted input device 100. The vehicle-mounted input device 1 of the present embodiment has nine recesses 42 at the ends and central part of the slots 41a to 41d forming the guide slot 41. In the forward end of the engaging pin 30 is fitted a small-diameter ball 31, which is movable in and out. When therefore the manual control section 70 is operated to change over the contact position of the engaging pin 30 in contact with the guide slot 41, the driver can feel a click every time the ball 31 engages with the recess 42. Therefore, it becomes easier and more reliable to change over the function of the electronic apparatus by a blind touch, thereby preventing occurrence of errors in the changeover of functions and a malfunction of the electronic apparatus.

The vehicle-mounted input device 1 of the present embodiment is provided with the vibrating device 72 and the photo interrupter 73 in the manual control section 70, is designed to automatically produce vibrations inherent to the electronic apparatus currently selected and vibrations inherent to each control position of the manual control section 70 when the driver has touched the manual control section 70 with his finger. The driver feels the vibrations to confirm by a blind touch the type of the electronic apparatus currently selected and the details of controllable function, thereby easily controlling the manual control section 70 and reducing a changeover error of the manual control section 70 and accordingly malfunction of the electronic apparatus.

In the meantime, when the solenoid 50 is changed over to the energized state, the driving shaft 51 is pulled downward and the guide plate 40 goes downward against the resilience of the spring 43, therefore disengaging the engaging pin 30 from the guide slot 41. The manual control section 70, released from the guide slot 41, is now freely movable within the range of movement of the XY table 20. Therefore, for example when the car navigation system, a personal computer, or a computer entertainment system, the manual control section 70 is usable to move the cursor on the display.

When the manual control section 70 of the vehicle-mounted input device is to be re-used for changing over the function of a vehicle-mounted electronic apparatus after finishing the use of a personal computer, the driver moves his hand off the manual control section 70 to de-energize the solenoid 50. Since the XY table 20 is fitted with the spring 27 as a center reset mechanism, the XY table 20 automatically returns to the center position when the driver moves his hand off the manual control section 70. Then, the engaging pin 30 attached on the XY table 20 moves as far as the central part of the guide slot 41, that is, to a point opposite to the neutral position A. Therefore, if the guide plate 40 is moved upward by the resilience of the spring 43 upon the de-energization of the solenoid 50, the usage pattern of the manual control section 70 can readily be changed over without causing the engaging pin 30 to hit against the guide plate 40.

The main point of this invention lies in the respect that the manual control section 70 is provided with finger detecting means (e.g., the photo interrupter 73) and alerting means (e.g., the vibrating device 72) which outputs a signal correspondingly to the control position of the manual control section to alert the driver by a blind touch. The configuration of other members, therefore, will be described or will not be described as occasion calls.

For example in the above-described embodiment, nine recesses 42 are formed at the end and central portions of the slots 41a to 41d which form the guide slot 41; and the ball 31 fitted in the forward end of the engaging pin 30 is movable in and out, so that when the manual control section 70 is operated, the driver can feel a click. This configuration may be dispensed with.

In the embodiment described above, the manual control section 70 and the stick controller 60 are connected indirectly through the XY table 20; it should be noted that these members 70 and 60 may be connected directly. Also, other moving members may be interposed between the manual control section 70 and the stick controller 60 in place of the XY table 20.

Furthermore, in the embodiment described above, the solenoid 50 was used as the guide plate driving means. It will be understood, however, that the invention is not to be limited thereto, and a device consisting of a motor and a power transmission mechanism which changes the turning force of the motor into a vertical moving force may be used.

In the embodiment described above, the driver is alerted of both the vibration inherent to the electronic apparatus selected by the switching device 170 and the vibration inherent to the control position of the manual control section 70. It should be noted, however, that, in place of such a configuration, the device may be designed to alert either one of the vibration inherent to the electronic apparatus selected by the switching device 170 and the vibration inherent to the control position of the manual control section 70.

Furthermore, in the embodiment described above, the control position of the manual control section 70 is restricted by engaging the engaging pin 30 with the guide plate 40. However, It is to be noticed that, in place of such a configuration, the control position of the manual control section 70 may be restricted by applying an external force produced by the motor or the actuator to the manual control section.

In this invention, the manual control section is provided with the finger detecting means and the alerting means which alerts the driver by a blind touch of a selected electronic apparatus by outputting a signal corresponding to the control position of the manual control section. Therefore the driver can see the control position of the manual control section before and after a changeover without observing the display device. Because the changeover of the manual control section can be reliably performed by a blind touch, the driver can easily perform the changeover of the function of the vehicle-mounted electronic apparatus as well as the driving of the motor vehicle.

According to this invention the motor vehicle is provided with a selector switch for selecting a specific electronic apparatus from among a plurality of vehicle-mounted electronic apparatuses, to thereby control, by operating the manual control section, the function of the electronic apparatus selected by operating the selector switch. It is therefore possible to easily and concentrically control the function of a plurality of electronic apparatuses by a single manual control section.

The vehicle-mounted input device of this invention, provided with vibrating means as an alerting means, can reliably alert the driver of required information without being adversely affected by external surroundings.

What is claimed is:

1. A vehicle-mounted input device, comprising:
 a single manual control section adapted so as to be manually movable to and held at a plurality of control positions;
 position signal input means for inputting into a control unit a signal corresponding to any of the control positions of the manual control section;

finger detecting means provided on the manual control section to detect a finger placed on the manual control section; and alerting means for alerting a driver to the control position of the manual control section by a blind touch by outputting a signal corresponding to the control position of the manual control section when the finger has been detected by the finger detecting means, the alerting means applies alerts of different modes to the manual control section.

2. A vehicle-mounted input device according to claim 1 wherein vibrating means is provided as the alerting means to apply vibrations of different modes to the manual control section in accordance with the control position of the manual control section.

3. A vehicle-mounted input device, comprising:

a single manual control section adapted so as to be manually movable to and held at a plurality of control positions;

position signal input means for inputting into a control unit a signal corresponding to any of the control positions of the manual control section;

a plurality of vehicle-mounted electronic apparatuses which are controlled by the control unit;

a selector switch for selecting a specific electronic apparatus from among the plurality of electronic apparatuses;

finger detecting means provided on the manual control section to detect a finger placed on the manual control section; and an alerting means which alerts a driver to the type of electronic apparatus selected by the operation of the selector switch and/or the control position of the manual control section by a blind touch by outputting a signal expressing the type of an electronic apparatus selected by the operation of the selector switch and/or the control position of the manual control section when the function of the electronic apparatus selected by the selector switch has been selected by moving the manual control section to one of the plurality of control positions and the finger has been detected by the finger detecting means, the alerting means applies alerts of different modes to the manual control section.

4. A vehicle-mounted input device according to claim 3 wherein vibrating means is provided as the alerting means to apply vibrations of different modes to the manual control section in accordance with the control position of the manual control section.

5. A vehicle-mounted input device according to claim 3, wherein vibrating means is provided as the alerting means to apply vibrations of different modes to the manual control section in accordance with the electronic apparatus selected by the selector switch.

6. A vehicle-mounted input device according to claim 4, wherein the vibrating means applies vibrations of different modes to the manual control section in accordance with the electronic apparatus selected by the selector switch.

7. A vehicle-mounted input device according to claim 6, wherein the vibrating means alternatively applies to the manual control section vibrations of different modes in accordance with the electronic apparatus selected by the selector switch and vibrations of different modes in accordance with the control position of the manual control section.

* * * * *